(12) United States Patent
Cho et al.

(10) Patent No.: US 7,050,463 B1
(45) Date of Patent: May 23, 2006

(54) AUTOMATIC BIT-RATE DETECTION SCHEME FOR USE ON SONET TRANSCEIVER

(75) Inventors: James B. Cho, Plano, TX (US); Harry W. Hartjes, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1009 days.

(21) Appl. No.: 09/703,430

(22) Filed: Oct. 31, 2000

(51) Int. Cl.
 *H04J 3/00* (2006.01)

(52) U.S. Cl. ..................... 370/476; 370/907
(58) Field of Classification Search ............... 370/389, 370/394, 465, 470–476, 907
 See application file for complete search history.

(56) References Cited

U.S. PATENT DOCUMENTS

| | | | | |
|---|---|---|---|---|
| 5,081,654 A | * | 1/1992 | Stephenson et al. | 375/368 |
| 6,466,886 B1 | * | 10/2002 | Marmur | 702/126 |
| 6,526,109 B1 | * | 2/2003 | Chang et al. | 375/371 |
| 6,631,144 B1 | * | 10/2003 | Johansen | 370/516 |

OTHER PUBLICATIONS

Belot et al, A 3.3-V Power Adaptiver 1244/622/155 Mbit/s Transceiver for ATM, SONET/SDH, IEEE pp. 1047-1058, 1998.*
Seo et al, A 3V Low Power 156/622/1244 Mbps CMOS Parallel Clock and Data Recovery Circuit for Optical Communications, IEICE, pp. 1720-1727, 2000.*
J. Christoph Scheytt, "A 0.155-, 0.622-, and 2.488-Gb/s Automatic Bit-Rate Selecting Clock and Data Recovery IC for Bit-Rate Transparent SDH Systems" IEEE Journal of Solid-State Circuits, vol. 34, No. 12, pp. 1935-1943, Dec. 1999.
OC-48/24/12/3 Sonet/SDH Multi-Rate Transceiver, Texas Instruments Product Review Revision 3.1.

* cited by examiner

*Primary Examiner*—Frank Duong
(74) *Attorney, Agent, or Firm*—J. Dennis Moore; W. James Brady, III; Frederick J. Telecky, Jr.

(57) ABSTRACT

An automatic bit-rate detection scheme (30) for use in SONET/SDH transceivers (12, 14) that uses only one clocking frequency (clk), is all digital, and requires less than 250 microseconds to detect a new data bit-rate. The present invention analyzes events that are guaranteed to be present in all SONET data streams. A1 and A2 framing bytes (22, 24) occur at 125 microseconds intervals in all SONET signals. The bit transitions in the framing bytes represent the minimum transition intervals of the received data. The present invention examines this bit interval to determine the operating frequency of the received data. A set of combinational logic circuits (70, 80, 90) are used to detect specific data bit patterns which appear in the A1 and A2 SONET framing bytes, such as "010" and "101". The combinational circuit looks for specific patterns of data bits occurring at a specific communication rate. Latches (76, 86, 96) capture the pulses that are generated by the combinational circuits each time that the particular bit pattern is detected. After sufficient time is passed, the output of the capturing latches indicates which data rates have been detected and logic determines the received data bit-rate, (52, 100). A multi-rate chip is then responsively set to communicate at the highest rate detected. The data can be shifted in serially or in parallel.

6 Claims, 5 Drawing Sheets

AUTOMATIC BIT-RATE DETECTION SCHEME FOR USE ON SONET TRANSCEIVER

FIELD OF THE INVENTION

The present invention is generally related to SONET/SDH communication networks, and more particularly to transceivers and methods of use in SONET/SDH networks.

BACKGROUND OF THE INVENTION

High speed synchronous optical communication networks are typically referred to as SONET/SDH networks. Conventionally, SONET/SDH transceivers transmit and receive at the same data rate. Thus, two SONET/SDH transceivers communicating with each other over an optical fiber link need to be configurable to operate at the same data speed, which can vary. This variable data rate requires that a machine or technician be able to configure the speed the two transceivers can communicate with each other at.

Typically, these SONET/SDH transmission equipment contain an input/output (IO) card that is designed to operate at particular operating data rate frequency. This maximum operating data rate frequency is primarily established and limited by the semiconductor transceiver devices comprising the transmitter and receiver and being designed for a specific data rate frequency.

In one conventional solution, outlined in an article entitled "A 0.155-,0.622-, and 2.488-Gb/s Automatic Bit-Rate Selecting Clock and Data Recovery IC for Bit-Rate Transparent SDH Systems" authored by J. C. Scheytt, G. Hanke and U. Langmann published in the December 1999 issue of IEEE Journal of Solid-State Circuits, there is described a system that provides an automatic bit-rate transceiver. This article describes the use of two clocking rates, analog elements i.e. low pass filter, threshold voltage generator, and voltage comparitor, relying on the relative frequency of the data edges. This transceiver circuit, disadvantageously, takes milliseconds to switch between different received data bit rates.

There is desired an improved SONET/SDH transceiver that is able to detect and receive data automatically and quickly, to set itself to operate at the highest and correct data rate frequency. The desired improvement would hopefully only use one clocking frequency, that is all digital, and requires significantly less time to detect and adjust to a new data bit rate.

SUMMARY OF THE INVENTION

The present invention achieves technical advantages as an automatic bit-rate detection scheme for use in SONET/SDH transceivers that uses only one clocking frequency, is all digital, and requires less than 250 microseconds to detect and synchronize to a received data bit-rate.

The present invention achieves these technical advantages by ascertaining and analyzing events that are guaranteed to be present in all SONET/SDH data streams. A1 and A2 framing bytes occur at 125 microseconds intervals in all SONET/SDH signals. The transitions of these bits in the framing bytes represent the minimum transition intervals of the received data. The present invention examines this transition interval to measure the bit data rate and determine the operating frequency of the received data. A series of flip-flops are used to clock in the A1 and A2 framing bytes at the maximum possible data bit-rate. A set of static combinational byte-logic circuits are used to detect specific data-bit patterns which appear in the A1 and A2 SONET framing bytes. Each combinational circuit looks for a pattern occurring at a specific communication rate. Flip-flops capture the pulses that are generated by the combinational circuits each time that the pattern is detected. After a sufficient predetermined time has passed, the output of the capturing flip-flops indicates which bit-rates have been detected. A multi-rate transceiver chip is then responsively set to operate at the highest rate detected.

DETAIL DESCRIPTION OF THE PREFERRED EMBODIMENT

Figure 1:
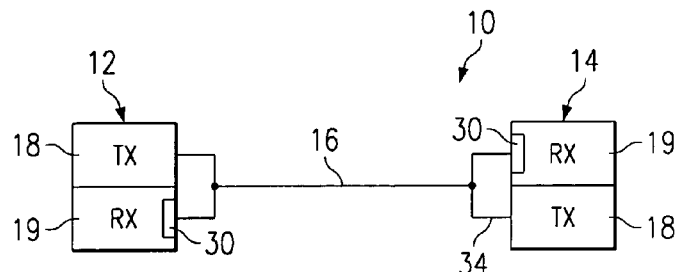
FIG. 1 is a block diagram overview of a SONET communication link having a multi bit-rate SONET transceiver at each end.

Referring now to FIG. 1 there is illustrated generally at 10 a SONET optical communication link having an optical transceiver 12 at one end and an optical transceiver 14 at the other end communicating with one another over an optical fiber link generally shown at 16.

In one illustrative case, but with no limitation to this data rate being intended, transceiver 12 will initiate data communications with receiving transceiver 14 at a data bit-rate which can be, for instance, 2.488 Gb/s (OC-48), 1.244 Gb/s (OC-24) (half maximum data bit-rate), or 0.622 Gb/s (OC-12) (¼ maximum data bit-rate). It is envisioned higher data rates can be provided and utilized such as those based on OC-192, OC-768 and so on. However, the receiving transceiver 14 will not initially know the data bit-rate of incoming data. According to the present invention, ascertaining this data bit-rate, quickly and accurately, using a single clock is achieved such that the receiving transceiver 14 can quickly be set to the data bit-rate and communicate back with transceiver 12 at this ascertained bit-rate. Each transceiver 12 and 14 is seen to comprise a transmitter 18 and a receiver 19.

Figure 2:
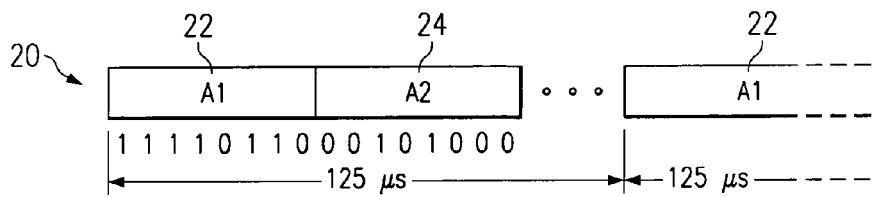
FIG. 2 illustrates the timing of the A1 and A2 framing bytes occurring at 125 microsecond intervals.

Referring to FIG. 2, there is illustrated at 20 that all SONET signals have A1 and A2 framing bytes shown at 22 and 24, respectively as part or subset of the data string shown in FIG. 2 occurring at 125 microsecond intervals. The framing bytes have bits represented as;

A1=11110110 (F6h)
A2=00101000 (28h)

These bits are transmitted unscrambled so that these framing bits represent the minimum transition intervals of the data corresponding to the maximum data bit-rate or data frequency. The present invention examines these framing and other bytes to quickly and accurately measure the data bit-rate and determine the operating frequency of the incoming received data. The "101" and "010" bit sequence portion of these A1 and A2 framing bytes are searched, the presence of which when detected is indicative of and corresponds to a maximum bit-rate.

Figure 3:
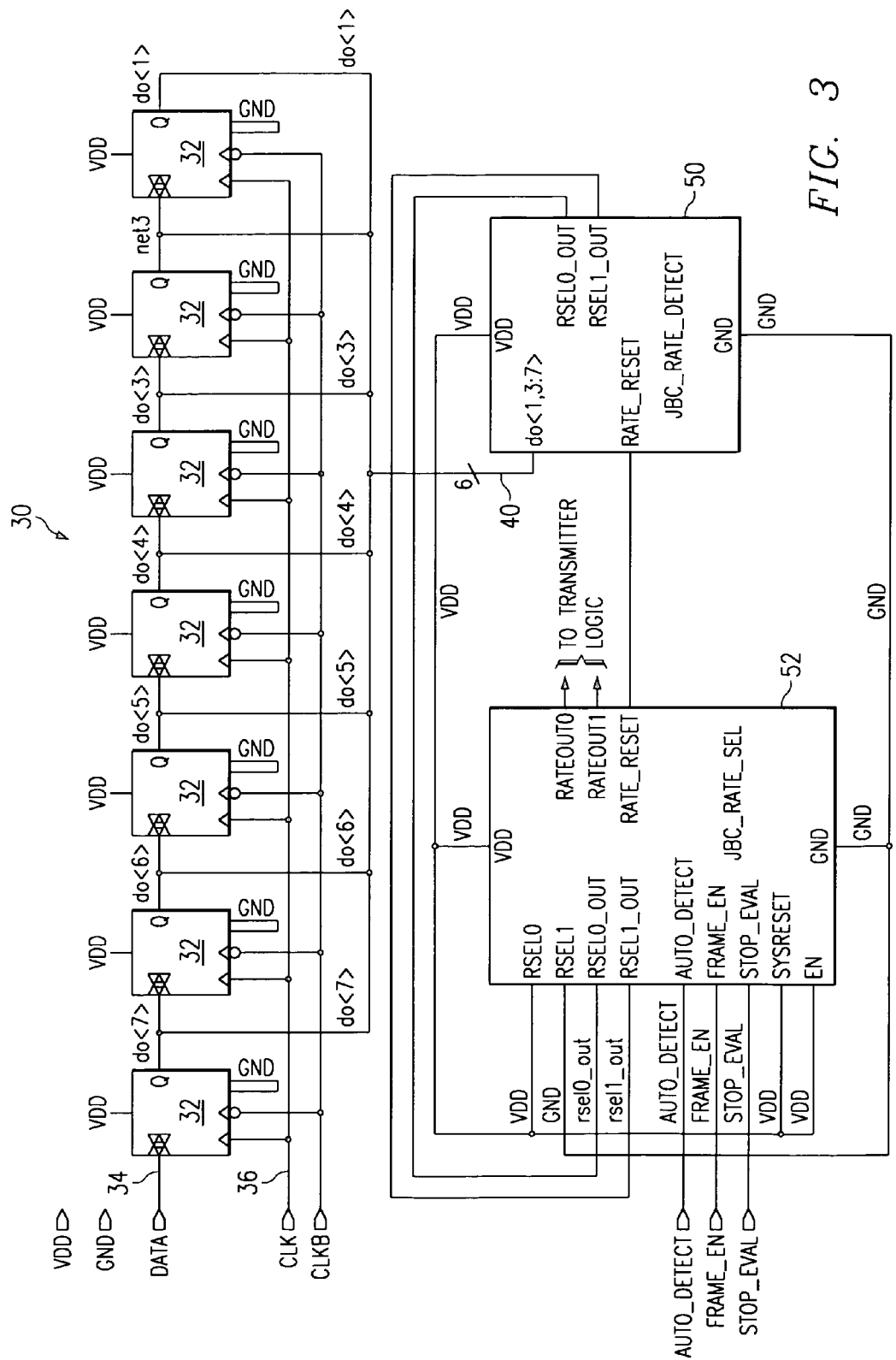
FIG. 3 is a schematic of a set of flip-flops used to serially clock in the arriving data. The flip-flops are clocked at the fastest bit-rate possible.

Referring now to FIG. 3, there is illustrated at 30 an automatic bit-rate detection circuit comprising a portion of transceiver 14. A set of flip-flops 32 are used to serially clock in the arriving bits of the A1 and A2 framing bytes. This arriving framing bits are provided to input 34 of the first flip-flop 32 shown at left. The maximum clock rate of clock 36, in this example, operating at 2.488 GHz/s, clocks the framing bits from input 34 through the set of flip-flops 32. If the actual incoming data bit-rate is the maximum data rate and clock speed, i.e. 2.488 Gb/s, each bit will be clocked into one flip-flop 32. If the actual incoming data bit-rate is ½ of the maximum data rate and clock speed, i.e. 1.244 Gb/s, each bit will be clocked into two (2) flip-flops 32. Likewise, if the incoming data bit-rate is received at ¼ the maximum data rate, i.e. 0.622 Gb/s, each bit of the framing data will be clocked into four (4) flip-flops 32.

The output of each flip-flop 32 is provided on data lines 40 to a rate detect circuit 50 according to the present invention. These data bits are provided in parallel to the logic circuit 50 and are represented as data bits do(1), do(3), do(4), do(5), do(6) and do(7).

Figure 4:
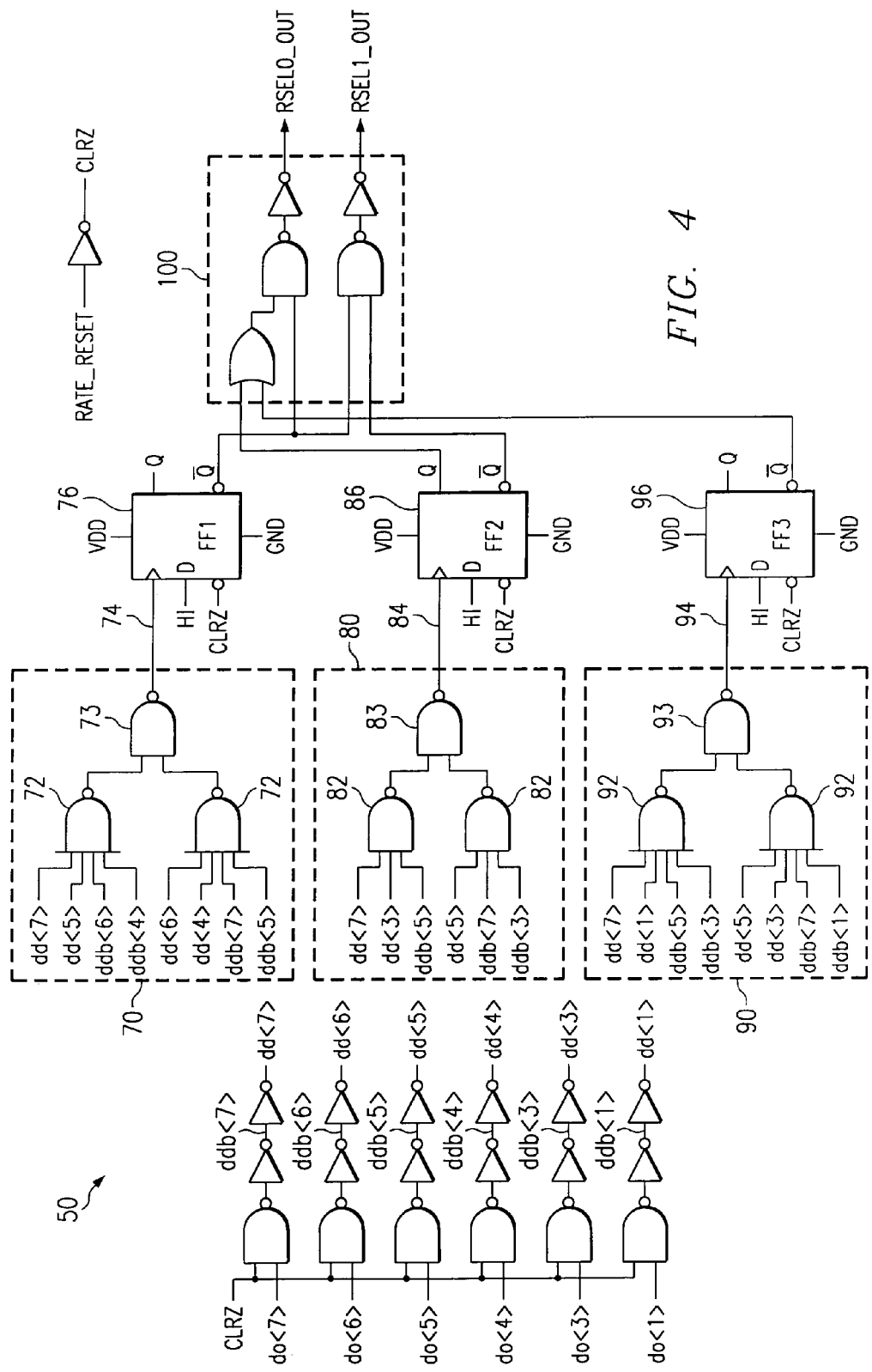
FIG. 4 is a schematic of the rate detect circuit 50 illustrated in FIG. 3 according to the present invention including combinational circuits detecting data patterns to ascertain the bit-rate of the incoming data; and FIGS, 5A, 5B and 5C together show a schematic of a second embodiment of the invention including a rate detection circuit adapted to analyze parallized data.

Referring now to FIG. 4, there is illustrated in more detail the rate detect circuit 50 shown in FIG. 3. Shown in FIG. 4 is a plurality of combinational logic circuits each having inputs connected to a unique set of nodes between flip-flops 32 and receiving the clocked output data from the respective flip-flops 32 in FIG. 3. Flip-flops 76, 86 and 96 are reset before the evaluation begins. The D inputs of flip-flops 76, 86 and 96 are set high so that the first time these flip-flops get clocked, their Q outputs go high. Shown at 70 is a first combinational logic group having a pair of 4-input NAND gates 72 receiving a first set of data bits data do(7), do(6), do(5) and do(4). The NAND gates are logically connected to look for a 1010 or 0101 data pattern. If either of these data bit patterns appear, the received framing data clocked into circuit 50 is determined to must be at the same rate as the clock 36, i.e. 2.488 Gb/s. Accordingly, and responsively, the combinational circuit 70 generates a logic 1 pulse at output 74 thereof, and a first D flip-flop shown at 76 will have a logic low at its inverting output 4.

Similarly, a second combinational logic circuit shown at 80 has a pair of 3-input NAND gates 82 looking at a second set of input data bits do(7), do(5), and do(3) and looking for a 101 or 010 data-bit pattern. If either of these data bit patterns appears, the incoming framing bytes data bits are determined to possibly, but not necessarily, be switching at ½ the maximum clock rate, i.e. 1.244 Gb/s. Accordingly, this combinational logic circuit 80 generates a logic at output 84, 1 pulse that will cause corresponding a D flip-flop shown at 86 to have a low value at its inverting output.

Shown at 90 is a third combinational logic circuit having a pair of 4-input NAND logic gates 92 looking at third set of input data bits do(7), do(5), do(3) and do(1) and looking for a data bit pattern 1001 or 0110. If this data bit sequence is detected, it is determined that the input data may be switching at ¼ the maximum clock rate i.e. 0.622 Gb/s. Accordingly, this combinational circuit 90 generates a logic 1 pulse at or about 94 that will cause a D flip-flop 96 to have a low value at its inverting output.

Knowing the predetermined data bit patterns of the bits in the A1 and A2 framing bytes, which again, is common in all SONET signals regardless of the data communication bit rate, allows the logic circuitry 50 to sample the serial data to search for the "101" or "010" bit sequence at the highest possible data bit rate, and thus ascertain the data-bit-rate. The D flip-flops 32 provide nodes which allow the combinational circuit to sample data of the flip-flops 32 and to determine the data bit-rate. For instance, with regards to the framing byte A1, if data is received at ½ the maximum data rate, every bit of the framing byte will be clocked into two (2) flip-flops 32.

Similarly, if incoming data is received at ¼ the maximum data rate, i.e., 0.622 Gb/s in this example, each framing bit of the data stream will be clocked into four of the flip-flops 32. Thus, the maximum data rate can be ascertained by searching for the "010" or "101" pattern which fits into the smallest number of flip-flops 32.

A combinational circuit shown at 100 monitors the outputs of logic circuits 76, 86 and 96, as shown, whereby the following data shown in Table 1 is generated:

TABLE 1

| RSEL 0_OUT | RSEL 1_OUT | INDICATION |
|---|---|---|
| 0 | 0 | FF1 is high |
| 1 | 0 | FF2 is high and FF1 is low |
| 0 | 1 | FF3 is high, and FF1 and FF2 are low |
| 1 | 1 | FF1, FF2, and FF3 outputs are low |

After 250 microseconds is determined to have passed since the inception of receiving data, which is sufficient for at least one SONET framing byte that is 125 microseconds long to have been received, these results are held by logic circuit 100 at outputs RSEL 0_OUT and RSEL 1_OUT. These outputs are sampled by logic circuitry 52 which determines using Table 1 which data bit-rate is being received as a function of these two outputs, and providing a logic output signal indicative of this received data bit-rate to transceiver 14. Transmitter 18 or Transceiver 14 then is able to communicate with transceiver 12 at the determined data bit-rate, automatically.

Figure 5C:
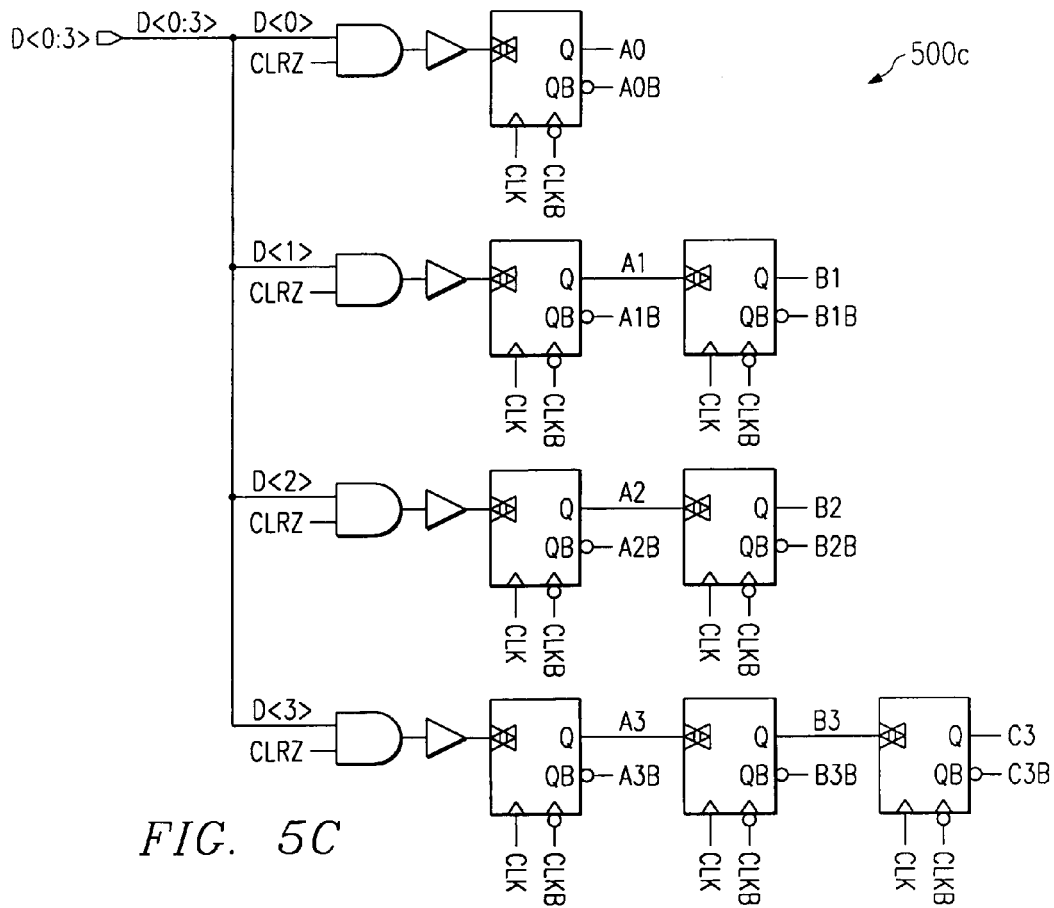
Figure 5A:
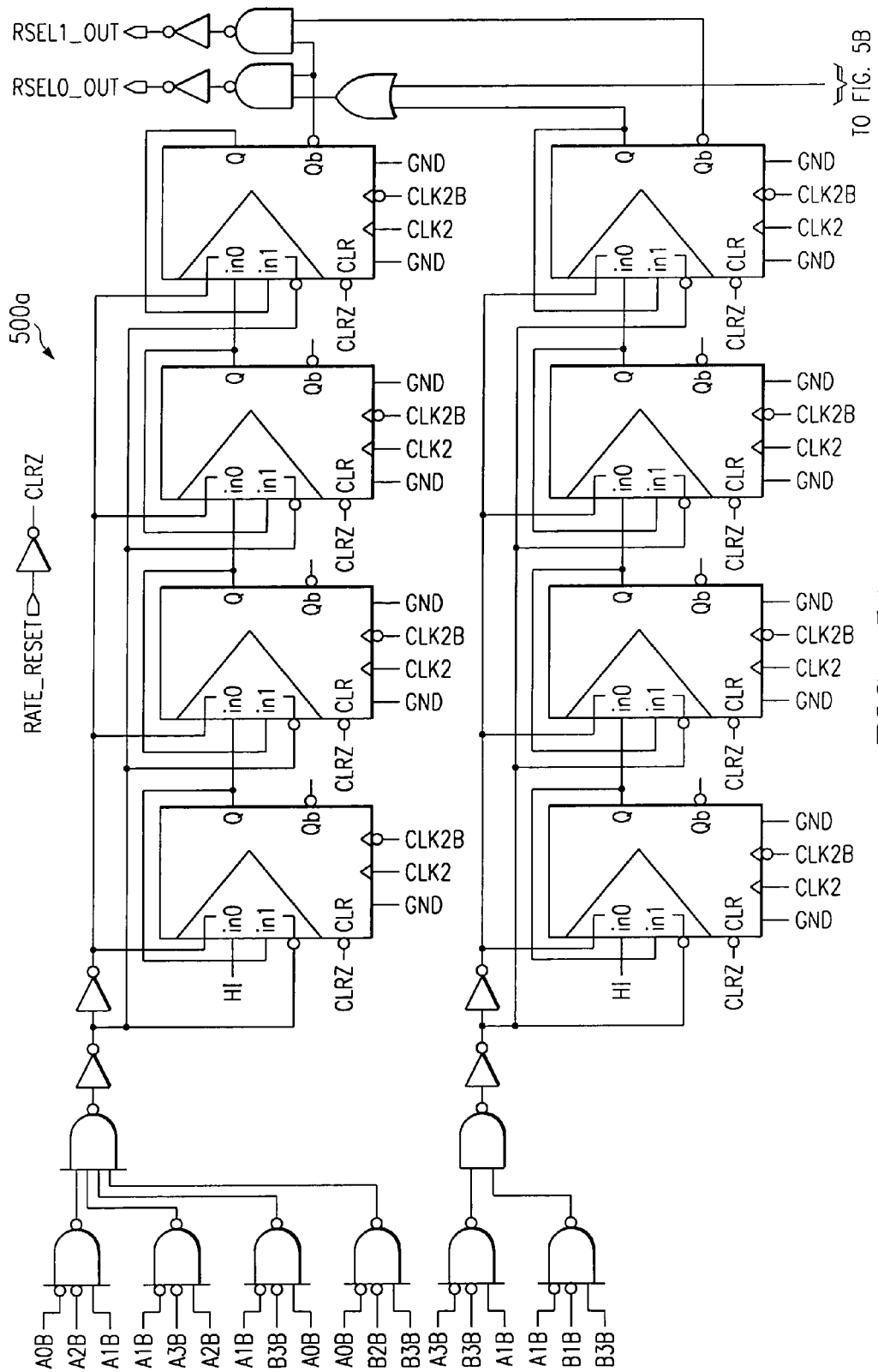
Figure 5B:
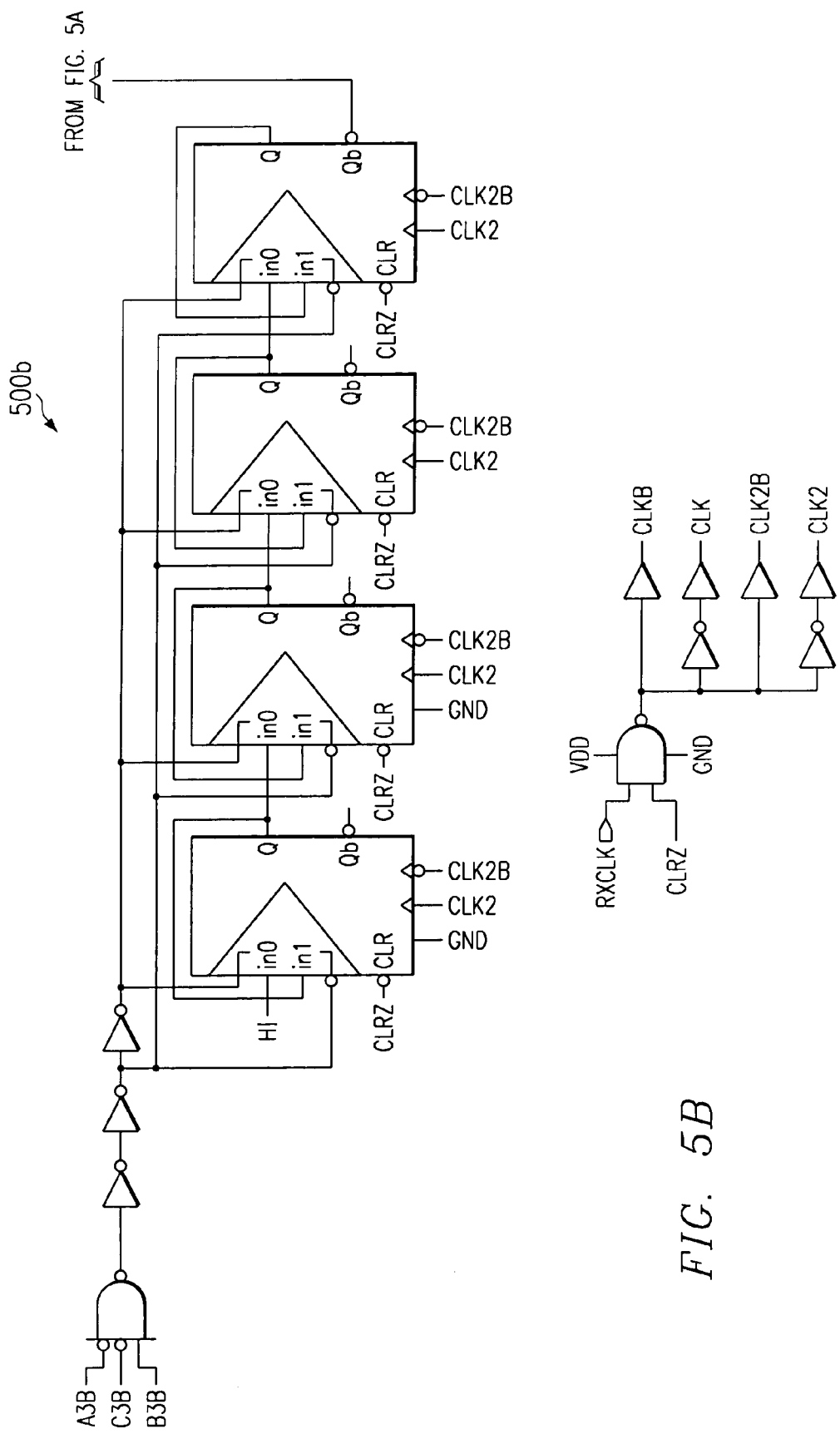

Referring now to FIGS. 5A, 5B and 5C, there is shown a schematic of a circuit 500 (portions 500a, 500b and 500c, respectively) that can detect a data rate of parallized data. By way of illustration, but without any intended limitation, data parallelized into a 4-bit bus will be discussed for clarity and understanding of this embodiment.

The data comes into the portion 500c of this circuit 500 in the form of a 4-bit bus. The task is to extract the "101" or "010" from the framing bytes of this data stream. The clock that drives these flip-flops no longer needs to be at the highest possible frequency of the data stream we want to detect. Rather, the clock CLK, in this example, runs at ¼ the highest possible data rate to be detected. The limitation is that, now, the "101" or "010" bit pattern could be hiding in one of several positions.

Looking at the case for the highest incoming rate, if we represent the data in serial manner, the bits would have come in as:

A3 A2 A1 A0 B3 B2 B1 as labeled in FIG. 5c

Note: this data stream matches the Q output label of the flip-flops.

The "101" or "010" bit pattern could be in:

(A3,A2,A1) or (A2,A1,A0) or (A1,A0,B3) or (A0,B3,B2)

Thus, the mechanism shown in FIGS. 5A, 5B and 5C needed to detect the "101" or "010" bit pattern becomes more complicated, as illustrated.

For the lower bit-rate cases, such as a received data bit-rate at ½ max rate data rate, the bit pattern we look for is "110011" or "001100". Since there are consecutive 0's and 1's the bits we observe get reduced, and this is taken advantage of in the circuit shown on FIG. 5.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A bit-rate detection circuit for detecting a bit rate of a stream of input bits of SONET data having a pair of sequential framing bytes of value F6h and 28h, provided at a first, maximum rate, a second rate of half the maximum rate, or a third rate at a rate of a quarter of the maximum rate, comprising:

a plurality of shift registers adapted to serially shift in the input bits of SONET data having a data rate from a first transceiver, said shift registers being clocked at the first rate; and logic circuitry responsively coupled to said shift registers and configured to provide an output signal indicative of the data rate by detecting a first pattern of 1010 or 0101 in first selected bits in the framing bytes in the shift registers, detecting a second pattern of 101 or 010 in second selected bits in the framing bytes in the shift registers, detecting a third pattern of 1001 or 0110 in third selected bits in the framing bytes in the shift registers, and setting the value of the output signal to indicate the first, second or third rate in dependence upon which of the first, second and third patterns are detected.

2. The bit-rate detection circuit of claim 1 wherein said logic circuitry includes a single clock operating at the first rate.

3. The bit-rate detection circuit of claim 1 wherein said logic circuitry is coupled to nodes between said shift registers.

4. The bit-rate detection circuit of claim 3 wherein said logic circuitry comprises a first logic set, a second logic set and a third logic set each providing an output signal, said first logic set being coupled to a first set of said nodes between said shift registers and detecting the first pattern, and said second logic set being coupled to a second set of said nodes between said shift registers and detecting the second pattern, and said third logic set being coupled to a third set of said nodes between said shift registers and detecting the third pattern.

5. The bit-rate detection circuit of claim 4, wherein said logic circuitry further comprises output logic circuitry responsively coupled to said first logic set, said second logic set and said third logic set, said output logic circuitry providing said output signal indicative of the data rate by providing the output signal:

indicating the first rate if said first logic set detects the first pattern, indicating the second rate if said second logic set detects the second pattern and the first logic set does not detect the first pattern, and indicating the third rate if said third logic set detects the third pattern, the first logic set does not detect the first pattern, and the second logic set does not detect the second pattern.

6. The bit-rate detection circuit of claim 1 further comprising a communications transceiver module responsively coupled to said logic circuitry output signal and adapted to transmit data back to said first transceiver at said incoming data rate.

* * * * *